United States Patent
Gorokhov et al.

(10) Patent No.: US 9,060,365 B2
(45) Date of Patent: Jun. 16, 2015

(54) METHOD AND APPARATUS FOR SHARING DECODING TIME ACROSS TRANSPORT BLOCKS

(71) Applicant: QUALCOMM Incorporated, San Diego, CA (US)

(72) Inventors: Alexei Yurievitch Gorokhov, San Diego, CA (US); John Edward Smee, San Diego, CA (US); Michael Lee McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 13/795,830

(22) Filed: Mar. 12, 2013

(65) Prior Publication Data

US 2014/0269627 A1    Sep. 18, 2014

(51) Int. Cl.
 *H04B 7/00* (2006.01)
 *H04W 72/04* (2009.01)
 *H04L 1/00* (2006.01)

(52) U.S. Cl.
 CPC ........... *H04W 72/0446* (2013.01); *H04L 1/004* (2013.01)

(58) Field of Classification Search
 CPC ................................................. H04W 76/04
 USPC .......... 370/310, 342, 345, 431, 437, 464, 465
 See application file for complete search history.

(56) References Cited

U.S. PATENT DOCUMENTS

| | | | |
|---|---|---|---|
| 6,571,366 B1 | 5/2003 | Doetsch et al. | |
| 6,879,648 B2* | 4/2005 | Ebel, Sr. | 375/340 |
| 7,765,453 B2 | 7/2010 | Duggan | |
| 7,783,958 B1 | 8/2010 | Eidson et al. | |
| 8,095,845 B1* | 1/2012 | Andreev et al. | 714/755 |
| 8,271,985 B2* | 9/2012 | Araki et al. | 718/102 |
| 8,423,869 B2* | 4/2013 | Shimanuki | 714/774 |
| 8,527,843 B2* | 9/2013 | Ramesh et al. | 714/774 |
| 8,537,750 B2* | 9/2013 | Jin et al. | 370/328 |

(Continued)

FOREIGN PATENT DOCUMENTS

EP    0973292 A2    1/2000

OTHER PUBLICATIONS

International Search Report and Written Opinion—PCT/US2014/020833—ISA/EPO—May 16, 2014.

(Continued)

*Primary Examiner* — Dmitry H Levitan
(74) *Attorney, Agent, or Firm* — Austin Rapp & Hardman

(57) ABSTRACT

Techniques for efficiently decoding data at a receiver are disclosed. In one aspect, total available decoding time of the receiver is initially allocated to a plurality of code blocks of a plurality of transport blocks to obtain initial allocated decoding times for the plurality of code blocks. The initial allocated decoding time for each code block may be given by a particular number of decoding iterations to perform for that code block. One or more code blocks of one or more transport blocks are decoded. After decoding the one or more code blocks, a remaining available decoding time is determined and reallocated to undecoded code blocks of the plurality of transport blocks to obtain updated allocated decoding times for the undecoded code blocks. The remaining available decoding time may be reallocated across code blocks of a transport block, across transport blocks, across carriers, across radio access technologies, or a combination thereof.

29 Claims, 9 Drawing Sheets

(56) References Cited

U.S. PATENT DOCUMENTS

| | | | |
|---|---|---|---|
| 8,539,298 B2* | 9/2013 | Shimanuki et al. | 714/751 |
| 8,570,878 B2* | 10/2013 | Kim et al. | 370/242 |
| 8,675,785 B2* | 3/2014 | Reial et al. | 375/341 |
| 2009/0235055 A1 | 9/2009 | Araki et al. | |
| 2011/0058484 A1 | 3/2011 | Kim et al. | |
| 2011/0119552 A1 | 5/2011 | Park et al. | |
| 2011/0280133 A1 | 11/2011 | Chang et al. | |
| 2014/0247909 A1* | 9/2014 | Niewczas et al. | 375/340 |

OTHER PUBLICATIONS

Salmela P., et al., "On allocation of turbo decoder iterations", Personal, Indoor and Mobile Radio Communications, 2003. PIMRC 2003. 14th IEEE Proceedings on Sept. 7-10, 2003, IEEE, Piscataway, NJ, USA, vol. 1, Sep. 7, 2003, pp. 157-160, XP010681576, DOI: 10.1109/PIMRC.2003.1264252, ISBN: 978-0-7803-7822-3, Chapter I-III.

* cited by examiner

METHOD AND APPARATUS FOR SHARING DECODING TIME ACROSS TRANSPORT BLOCKS

BACKGROUND

I. Field

The present disclosure relates generally to communication, and more specifically to techniques for performing decoding by a receiver.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A transmitter (e.g., a base station) may send multiple code blocks (or data packets) within a predetermined time interval to a receiver (e.g., a UE). The transmitter may separately encode each code block with a Turbo encoder and may obtain multiple encoded blocks. The transmitter may further process and transmit the multiple encoded blocks (e.g., on different spatial, time, and/or frequency resources) within the predetermined time interval. The multiple encoded blocks may be generated based on the same or different modulation and coding schemes (MCS), may observe different channel conditions, and may have different requirements for correct decoding. It may be desirable to efficiently perform decoding for all code blocks received by the receiver.

SUMMARY

Techniques for efficiently decoding data at a receiver in a wireless communication system are disclosed herein. In an aspect of the present disclosure, an available decoding time of the receiver may be allocated to code blocks and shared across transport blocks, or carriers, or radio access technologies, or some other dimension, or a combination thereof. This sharing of the available decoding time may improve decoding performance for a given decoding capability of the receiver. This sharing may allow the receiver to support worst-case operating conditions with less required decoding capability and to provide better performance under other operating conditions.

In one example, a total available decoding time of a receiver may be initially allocated to a plurality of code blocks of a plurality of transport blocks. Each transport block may include at least one code block, and each code block may have any size. Each transport block may be associated with a particular MCS to use for each code block of the transport block. Initial allocated decoding times for the plurality of code blocks of the plurality of transport blocks may be determined from the initial allocation. The initial allocated decoding time for each code block may be given by a particular number of decoding iterations to perform for that code block.

One or more code blocks of one or more of the plurality of transport blocks may be decoded. Each code block may be decoded within the initial allocated decoding time for that code block or possibly earlier. After decoding the one or more code blocks, a remaining available decoding time may be determined and may be equal to the total available decoding time minus the actual decoding times of the one or more code blocks already decoded. The remaining available decoding time may be reallocated to undecoded code blocks of the plurality of transport blocks to obtain updated allocated decoding times for the undecoded code blocks.

The plurality of transport blocks may be received via one or more spatial channels on one or more carriers via one or more radio access technologies. In one example the remaining available decoding time may be reallocated across code blocks of a transport block. In another example the remaining available decoding time may be reallocated across transport blocks, e.g., on the same carrier or the same radio access technology. In yet another example the remaining available decoding time may be reallocated across carriers, e.g., for the same radio access technology. In yet another example the remaining available decoding time may be reallocated across radio access technologies. In general, the remaining available decoding time may be reallocated across any number of dimensions and any particular dimension.

Various aspects and features of the disclosure are described in further detail below.

DETAILED DESCRIPTION

The decoding techniques described herein may be used for various wireless communication systems and standards. The terms "system" and "network" are often used interchangeably. For example, the techniques may be used for CDMA, TDMA, FDMA, OFDMA, SC-FDMA, and other systems. Different systems may implement different radio access technologies. For example, a CDMA system may implement a radio access technology such as Universal Terrestrial Radio Access (UTRA), cdma2000, etc. UTRA includes Wideband CDMA (WCDMA), Low Chip Rate (LCR), and other variants of CDMA. cdma2000 includes IS-2000, IS-95 and IS-856 standards. A TDMA system may implement a radio access technology such as Global System for Mobile Communications (GSM). An OFDMA system may implement a radio access technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) and LTE-Advanced (LTE-A) are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP), cdma2000 and UMB are described in documents from an organization named "3rd Generation Partnership Project 2" (3GPP2). The techniques described herein may be used for the wireless systems and radio access technologies mentioned above as well as other wireless systems and radio access technologies.

Figure 1:
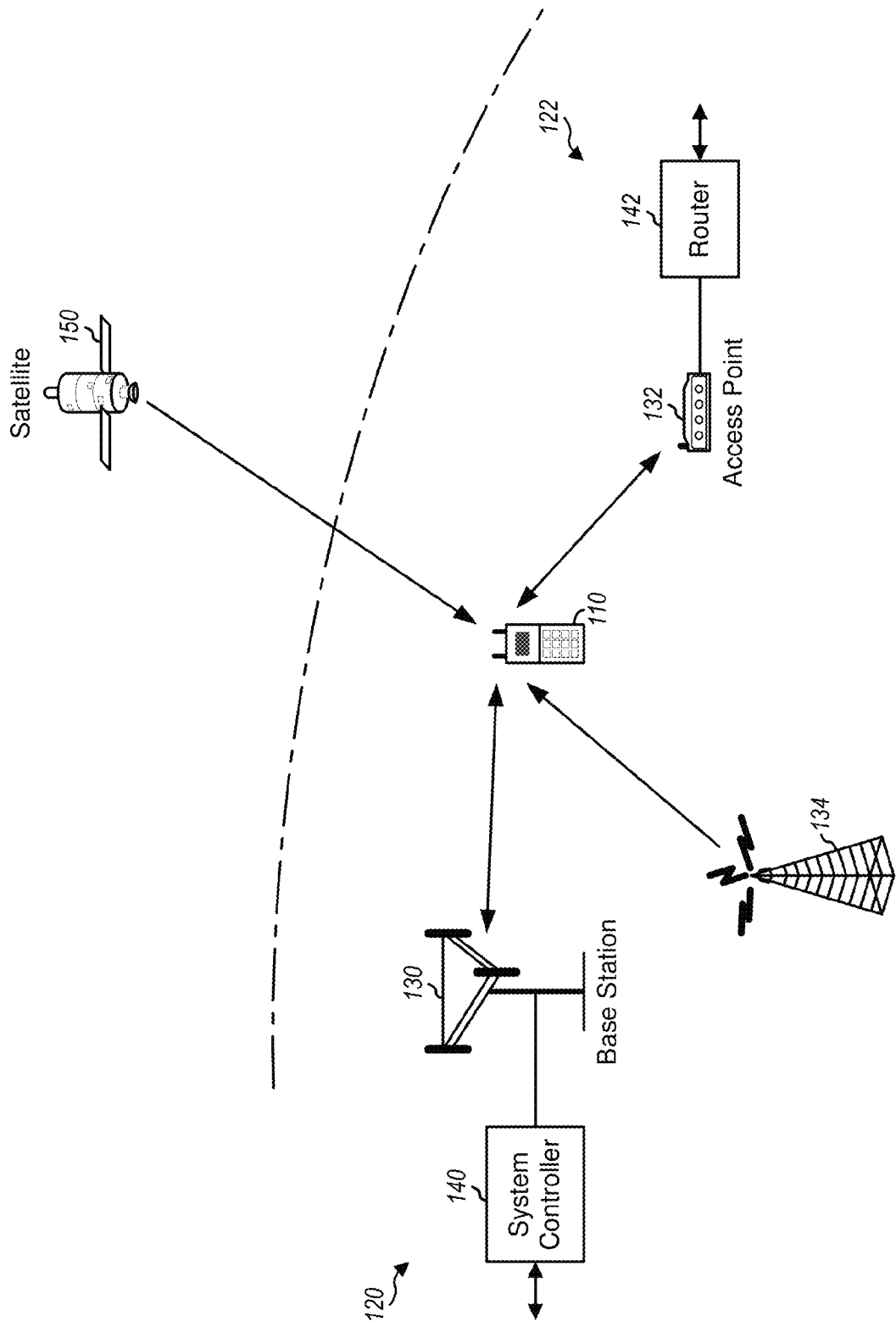
FIG. 1 shows a user equipment (UE) capable of communicating with different wireless communication systems.

FIG. 1 shows a UE 110 capable of communicating with different wireless communication systems 120 and 122. Wireless system 120 may be an LTE system, a CDMA system, a GSM system, or some other wireless system. Wireless system 122 may be a wireless local area network (WLAN) system, which may implement IEEE 802.11, Hiperlan, etc. For simplicity, FIG. 1 shows wireless system 120 including one base station 130 and one system controller 140, and wireless system 122 including one access point 132 and one router 142. In general, each wireless system may include any number of base stations and any set of network entities. A base station may be an entity that communicates with the UEs and may also be referred to as a Node B, an evolved Node B (eNB), an access point, etc. A base station may support one or multiple (e.g., three) cells, where the term "cell" can refer to a coverage area of a base station and/or a base station subsystem serving the coverage area.

UE 110 may be stationary or mobile and may also be referred to as a mobile station, a terminal, an access terminal, a subscriber unit, a station, etc. UE 110 may be a cellular phone, a smartphone, a tablet, a wireless communication device, a personal digital assistant (PDA), a wireless modem, a handheld device, a laptop computer, a smartbook, a netbook, a cordless phone, a wireless local loop (WLL) station, a Bluetooth device, etc. UE 110 may communicate with wireless system 120 and/or 122. UE 110 may also receive signals from broadcast stations (e.g., a broadcast station 134), signals from satellites (e.g., a satellite 150) in one or more global navigation satellite systems (GNSS), etc. UE 110 may support one or more radio access technologies for wireless communication such as LTE, WCDMA, CDMA 1X, EVDO, TD-SCDMA, GSM, IEEE 802.11, etc.

Figure 2:
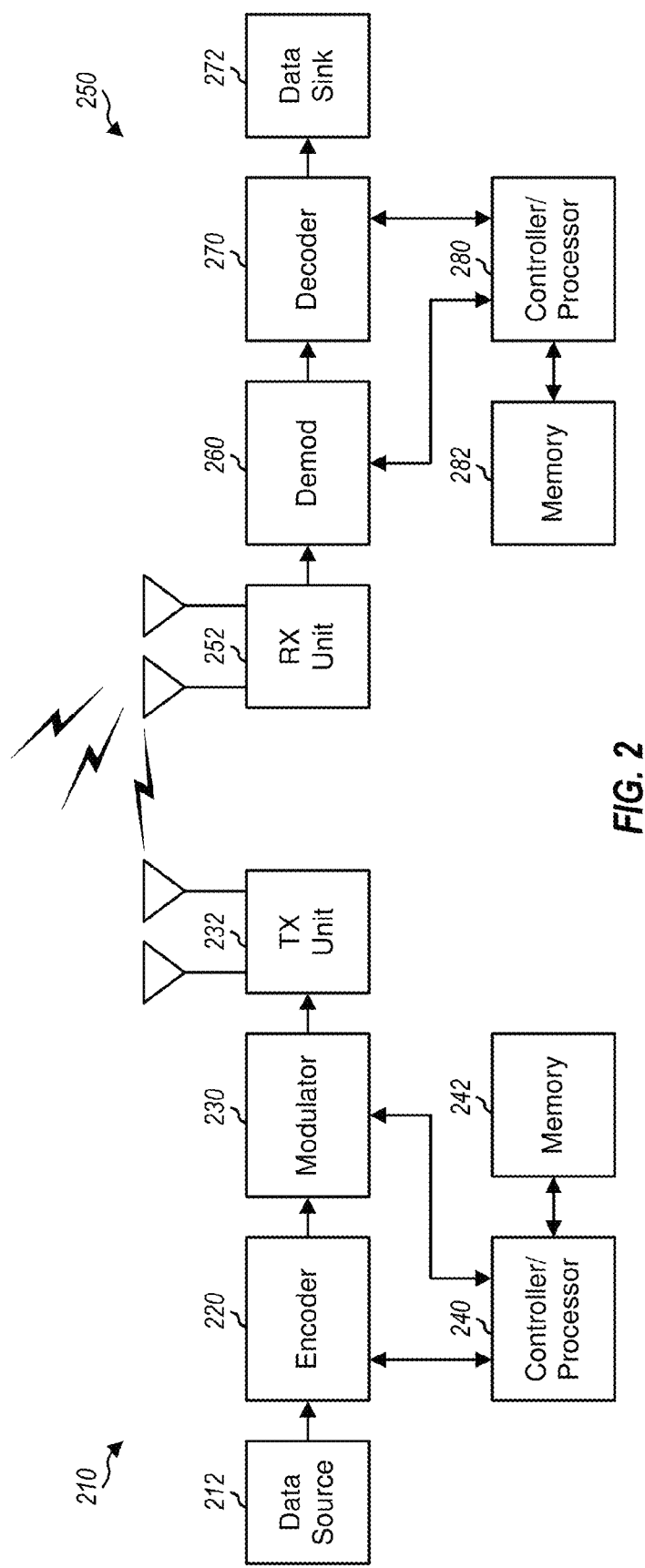
FIG. 2 shows a functional block diagram of a transmitter and a receiver.

FIG. 2 shows an exemplary functional block diagram of a transmitter 210 and a receiver 250. For data transmission on the downlink, transmitter 210 may be part of base station 130 in FIG. 1, and receiver 250 may be part of UE 110. For data transmission on the uplink, transmitter 210 may be part of UE 110, and receiver 250 may be part of base station 130. Transmitter 210 may be equipped with T antennas, and receiver 250 may be equipped with R antennas, where in general T≥1 and R≥1.

At transmitter 210, an encoder 220 may receive data to be transmitted from a data source 212. Encoder 220 may partition the data into one or more transport blocks and may further partition each transport block into one or more code blocks. Each transport block may be associated with a particular MCS to use for each code block of the transport block. An MCS may be associated with a particular code rate and a particular modulation scheme such as BPSK, QPSK, 16-QAM, 64-QAM, etc. A modulation scheme may also be referred to as a modulation format, a modulation order, etc. An MCS may also be referred to as a transport format, a packet format, etc. The code blocks of a transport block may (i) have the same size and include the same number of information/data bits or (ii) have different sizes and include different numbers of data bits. Each code block may be encoded separately by a transmitter and decoded separately by a receiver. A code block and a transport block may also be referred to by other terminology. For example, a code block may also be referred to as a data block, a data packet, a sub-packet, etc.

Encoder 220 may generate and attach a cyclic redundancy check (CRC) to each transport block. The CRC for each transport block may be used by a receiver to determine whether the transport block is decoded correctly or in error. Encoder 220 may partition each transport block and its CRC into one or more code blocks. Encoder 220 may generate and attach a CRC to each code block. The CRC for each code block may be used by a receiver to determine whether the code block is decoded correctly or in error. Encoder 220 may encode each code block and its CRC based on a coding scheme (e.g., a Turbo code) and a code rate determined by an MCS applicable for that code block to obtain a corresponding encoded block. An encoded block may also be referred to as a codeword, etc. Encoder 220 may provide encoded blocks for all transport blocks being transmitted.

A modulator 230 may receive encoded blocks for all transport blocks from encoder 220. Modulator 230 may generate modulation symbols for each encoded block based on a modulation scheme determined by an MCS applicable for that encoded block. Modulator 230 may spatially process the modulation symbols for multiple-input multiple-output (MIMO) transmission, transmit diversity, etc. Modulator 230 may further process the modulation symbols for all transport blocks based on OFDM, SC-FDMA, CDMA, and/or other modulation technique utilized by a radio access technology supported by transmitter 210 and receiver 250. Modulator 230 may provide output samples comprising all transport blocks being transmitted. A transmit (TX) unit 232 may condition (e.g., convert to analog, amplify, filter, and upconvert) the output samples to obtain T modulated signals, which may be transmitted via the T antennas at transmitter 210.

Receiver 250 may receive the T modulated signals from transmitter 210 and possibly other modulated signals from other transmitters (not shown in FIG. 2). Within receiver 250, a receive (RX) unit 252 may obtain R received signals from the R antennas at receiver 250 and may condition (e.g., filter, amplify, downconvert, and digitize) the R received signals to obtain input samples. A demodulator (Demod) 260 may process the input samples for OFDM, SC-FDMA, CDMA and/or other modulation technique to obtain received symbols. Demodulator 260 may also perform processing complementary to the spatial processing (if any) performed by transmitter 210. Demodulator 260 may also perform demodulation for each code block based on a modulation scheme used for that code block and may provide demodulated data.

A decoder 270 may decode the demodulated data for each code block to obtain a corresponding decoded block. Decoder 270 may check each decoded block based on its CRC to determine whether the decoded block is decoded correctly or in error. Decoder 270 may concatenate all decoded blocks for each transport block and may check each decoded transport block based on its CRC to determine whether the transport block is decoded correctly or in error. Decoder 270 may provide decoded transport blocks to a data sink 272. Decoder 270 may also provide decoding status of each code block and/or each transport block. The decoding status of each code block or transport block may indicate whether the code block or transport block is decoded correctly or in error.

Controllers/processors 240 and 280 may direct the operation at transmitter 210 and receiver 250, respectively. Memories 242 and 282 may store data and program codes for transmitter 210 and receiver 250, respectively.

Figure 3:
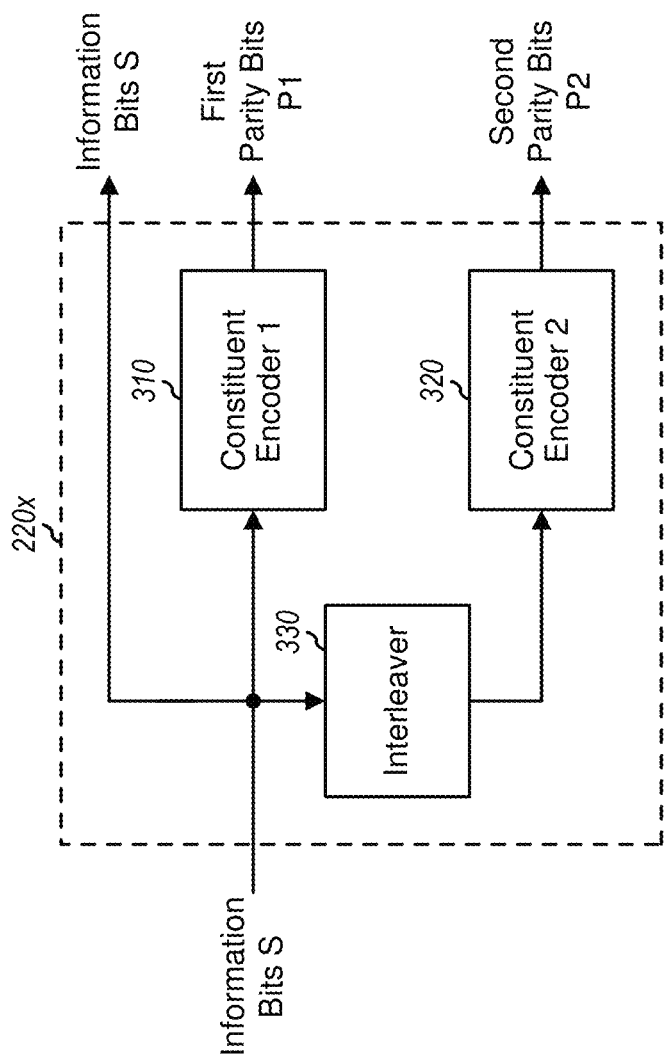
FIG. 3 shows a functional block diagram of a Turbo encoder at the transmitter.

FIG. 3 shows an exemplary functional block diagram of a Turbo encoder 220$x$, which is one example of encoder 220 within transmitter 210 in FIG. 2. Turbo encoder 220$x$ includes two constituent encoders 310 and 320 and an interleaver 330. Information/data bits (which are denoted as "S") for a code block are encoded by encoder 310 to generate first parity bits (which are denoted as "P1"). The information bits for the code block are also interleaved by interleaver 330. The interleaved information bits from interleaver 330 are encoded by encoder 320 to generate second parity bits (which are denoted as "P2"). The information bits, the first parity bits, and the second parity bits of the code block may be further processed (e.g., for rate matching) to obtain code bits of the code block. Turbo encoding may be performed for each code block to be transmitted by transmitter 210 to obtain a corresponding encoded block.

Figure 4:
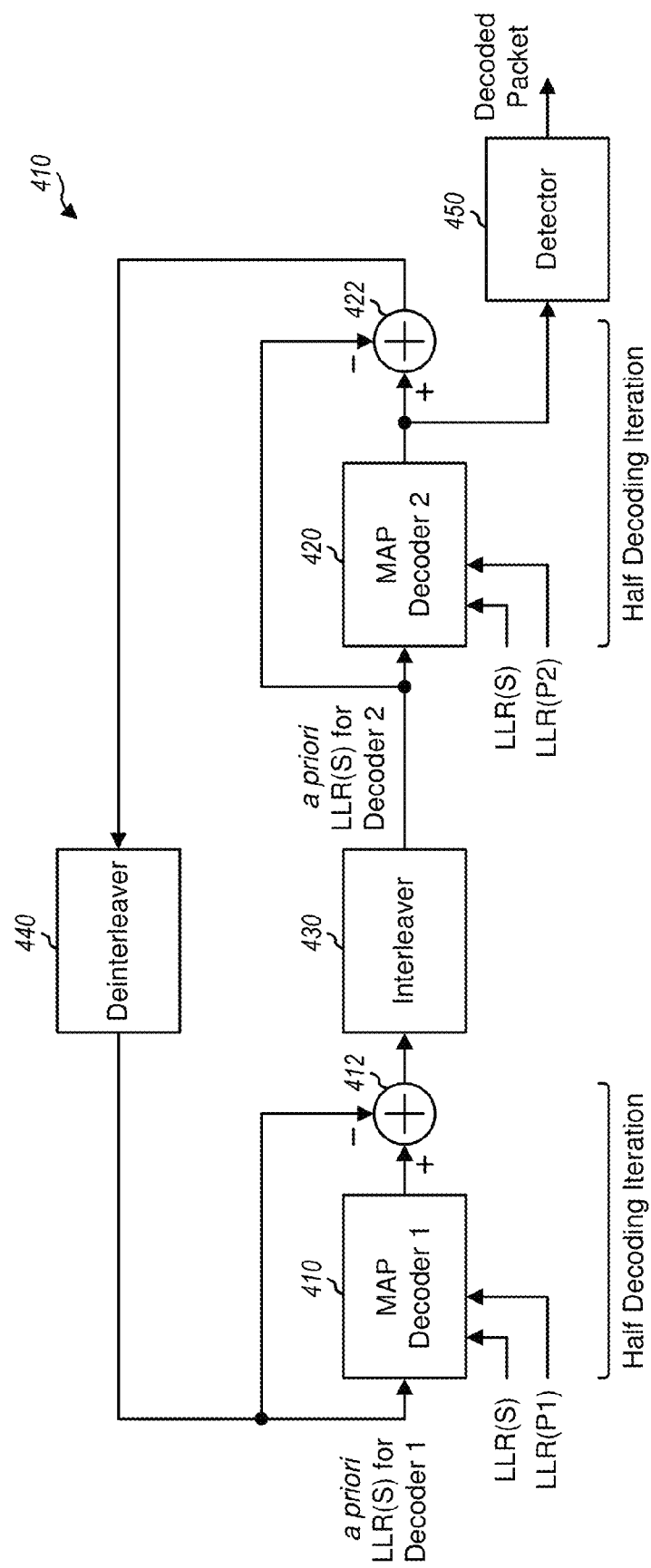
FIG. 4 shows a functional block diagram of a Turbo decoder at the receiver.

FIG. 4 shows an exemplary functional block diagram of a Turbo decoder 270$x$, which is one example of decoder 270 within receiver 250 in FIG. 2. Turbo decoder 270$x$ includes two maximum a posteriori (MAP) decoders 410 and 420, an interleaver 430, and a deinterleaver 440. Demodulator 260 within receiver 250 may process received signals and obtain demodulated symbols for each code block. Demodulator 260 may compute log-likelihood ratios (LLRs) for code bits of each code block based on the demodulated symbols for the code block and possibly other information such as noise and interference estimates. The LLR for each code bit may indicate the likelihood of the code bit being '0' or '1'.

In the example shown in FIG. 4, decoder 410 receive LLRs for information bits (which are denoted as LLR(S)), LLRs for first parity bits (which are denoted as LLR(P1)), and a priori LLRs for decoder 410 (which are equal to zero for the first iteration). Decoder 410 decodes the received LLRs and provides a posteriori LLRs from decoder 410. A summer 412 subtracts the a priori LLRs for decoder 410 from the a posteriori LLRs from decoder 410, and the results are interleaved by interleaver 430 to obtain a priori LLRs for decoder 420. Decoder 420 receives LLRs for information bits (or LLR(S)), LLRs for second parity bits (which are denoted as LLR(P2)), and a priori LLRs for decoder 420. Decoder 420 decodes the received LLRs and provides a posteriori LLRs from decoder 420. A summer 422 subtracts the a priori LLRs for decoder 420 from the a posteriori LLRs from decoder 420, and the results are deinterleaved by deinterleaver 440 to obtain new a priori LLRs for decoder 410.

As shown in FIG. 4, a half decoding iteration may include decoding by one MAP decoder 410 or 420. In general, any number of half decoding iterations may be performed. The LLRs for the code bits of a code block typically become more reliable after each half decoding iteration. After all half decoding iterations have been performed, a detector 450 may process the final LLRs from decoder 420 and provide decode data for the code block. In the description herein, a decoding iteration may refer to a half decoding iteration (e.g., performed by one decoder 410 or 420) or a full decoding iteration (e.g., performed by both decoders 410 and 420).

Iterative decoding (e.g., as shown in FIG. 4) may be used in various forward error correction (FEC) schemes such as Turbo codes (which are also referred to as concatenated/ interleaved convolutional codes), low density parity check (LDPC) codes, etc. The number of decoding iterations performed for each constituent code of a Turbo code (and likewise the number of LDPC decoding iterations) may impact decoding performance, e.g., in terms of a data rate supported by a given communication channel or, equivalently, a block error rate (BLER) achievable for a given data rate.

FEC schemes may be combined with hybrid automatic repeat request retransmission (HARQ) and adaptive link adaptation to improve throughput for given channel conditions and receiver design. Increasing the number of decoding iterations for each code block may directly lead to improved throughput. However, increasing the number of decoding iterations would require greater decoding capability and also result in higher battery power consumption, both of which may increase proportional to the number of decoding iterations. Furthermore, processing requirements, hardware cost, and/or clock/voltage requirements may be determined by the peak number of decoding iterations which, in turn, may determine achievable spectral efficiency under certain channel conditions. Careful management of iterative decoding budget may thus be an important modem design task, especially for a receiver/UE with capability to receive data via different dimensions such as space, time, frequency, radio access technology, etc.

UE 110 may support carrier aggregation (CA), which is simultaneous operation on multiple carriers. Carrier aggregation may also be referred to as multi-carrier operation. A carrier may refer to a range of frequencies used for communication. For example, a carrier may have a bandwidth 1.4, 3, 5, 10, 15 or 20 megahertz (MHz) in LTE. A carrier may also be associated with system information and/or control information describing operation on the carrier. A carrier may also be referred to as a component carrier (CC), a frequency channel, a cell, etc. UE 110 may be configured with up to 5 carriers in one or two frequency bands in LTE Release 11.

UE 110 may support MIMO transmission, which is transmission from multiple transmit antennas at a transmitter to multiple receive antennas at a receiver. For MIMO transmission, data may be transmitted via one or more spatial channels or layers of a MIMO channel from the multiple transmit antennas to the multiple receive antennas. For example, up to two codewords for up to two code blocks may be sent simultaneously via up to four layers in LTE Release 11.

UE 110 may also support coordinated multi-point (CoMP) transmission. For CoMP transmission, multiple cells may simultaneously send one or more data streams to one or more UEs on the same time-frequency resources based on channel feedback from at least one UE. CoMP transmission may improve throughput and provide other advantages by exploiting additional spatial dimensionality provided by multiple transmit antennas at the multiple cells and multiple receive antennas at the UE. The channel feedback may be used by the multiple cells to spatially process the one or more data streams prior to transmission. CoMP transmission may be sent using either joint processing or cooperative beamforming. For joint processing, multiple cells may simultaneously send different data streams to one or more UEs, and each UE may perform receiver spatial processing/detection to recover the data stream(s) transmitted to that UE. For coordinated beamforming, the multiple cells may select beam directions and power density such that data transmission is steered toward a target UE and away from other UEs, which may reduce interference to the other UEs.

UE 110 may support concurrent communication with multiple wireless systems of different radio access technologies. For example, UE 110 may support dual SIM/dual standby (DSDS) and/or dual SIM/dual-active (DSDA) and may be able to concurrently communicate with multiple wireless systems such as LTE and GSM systems, or TD-SCDMA and GSM systems, or CDMA and GSM systems, etc. In FIG. 1, UE 110 may concurrently communicate with base station 130 in wireless system 120 (e.g., an LTE system) and access point 132 in wireless system 122 (e.g., a WLAN system). UE 110 may receive any number of code blocks from each wireless system in a given time interval.

UE 110 may receive a number of code blocks in one or more transport blocks in a given time interval. The code blocks may be sent to UE 110 via one or more spatial channels on one or more carriers using one or more radio access technologies. UE 110 may decode all received code blocks within a time period available for decoding these code blocks.

Figure 5:
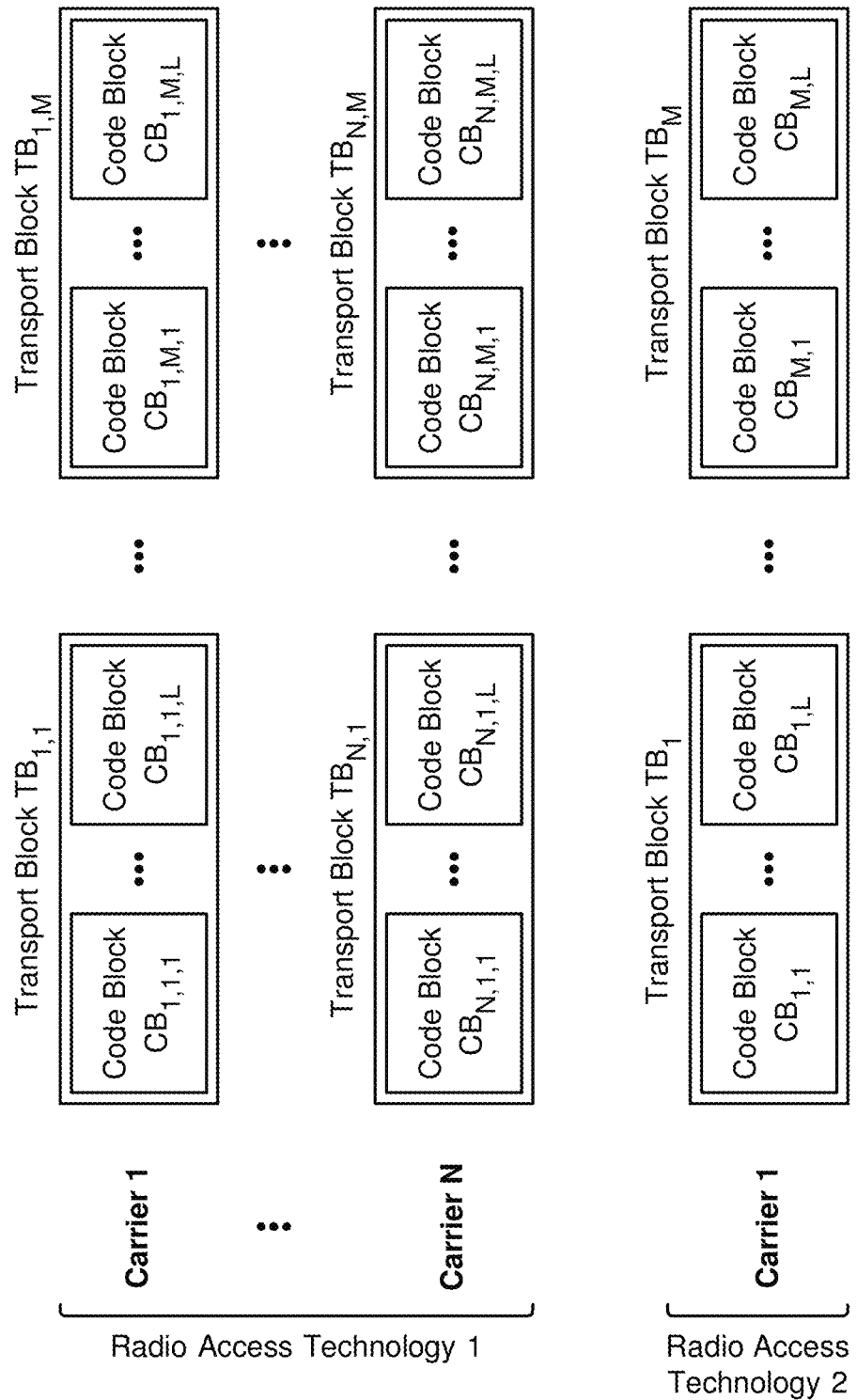
FIG. 5 shows exemplary reception of code blocks on multiple carriers via multiple radio access technologies.

FIG. 5 shows exemplary reception of code blocks on multiple carriers via multiple radio access technologies. UE 110 may receive code blocks on N carriers via a first radio access technology and on one carrier via a second radio access technology, where N may be one or greater. In the example shown in FIG. 5, UE 110 may receive M transport blocks on each carrier via the first radio access technology, with each transport block including L code blocks, where L and M may each be one or greater. UE 110 may also receive M transport blocks via the second radio access technology, with each transport block including L code blocks.

For simplicity, FIG. 5 shows UE 110 receiving the same number of transport blocks (M) on each carrier, and each transport block including the same number of code blocks (L). In general, UE 110 may receive any number of transport blocks on each carrier via each radio access technology, and each transport block may include any number of code blocks.

In general, multiple transport blocks may be received in a given time interval (e.g., a subframe) and may include one or more of the following:
  Multiple transport blocks sent with different Radio Network Temporary Identifiers (RNTIs),
  Multiple (e.g., two to eight) transport blocks sent with MIMO,
  Multiple transport blocks sent with carrier aggregation, where transport blocks may be sent on each carrier with or without MIMO, and
  Multiple transport blocks sent by different wireless systems of different radio access technologies.

UE 110 may receive one or more unicast transport blocks sent on a Physical Downlink Shared Channel (PDSCH) with a Cell RNTI (C-RNTI), a paging transport block sent with a Paging RNTI (P-RNTI), one or more transport blocks carrying system information sent with a System Information RNTI (SI-RNTI), etc. UE 110 may receive different numbers of transport blocks on different carriers. For example, UE 110 may receive ten transport blocks on three carriers. Two transport blocks may be sent with MIMO on each of two carriers, four transport blocks may be sent with MIMO on a third carrier, one transport block may be sent with an SI-RNTI, and a transport block may be sent with a P-RNTI. As another example, UE 110 may receive four transport blocks on two carriers. One transport block may be sent without MIMO on a primary component carrier (PCC), two transport blocks may be sent with MIMO on a secondary component carrier (SCC), and one transport block may be seat on the PCC with an SI-RNTI. Each transport block may have a different transport block size and possibly a different number of code blocks per transport block.

Figure 6:
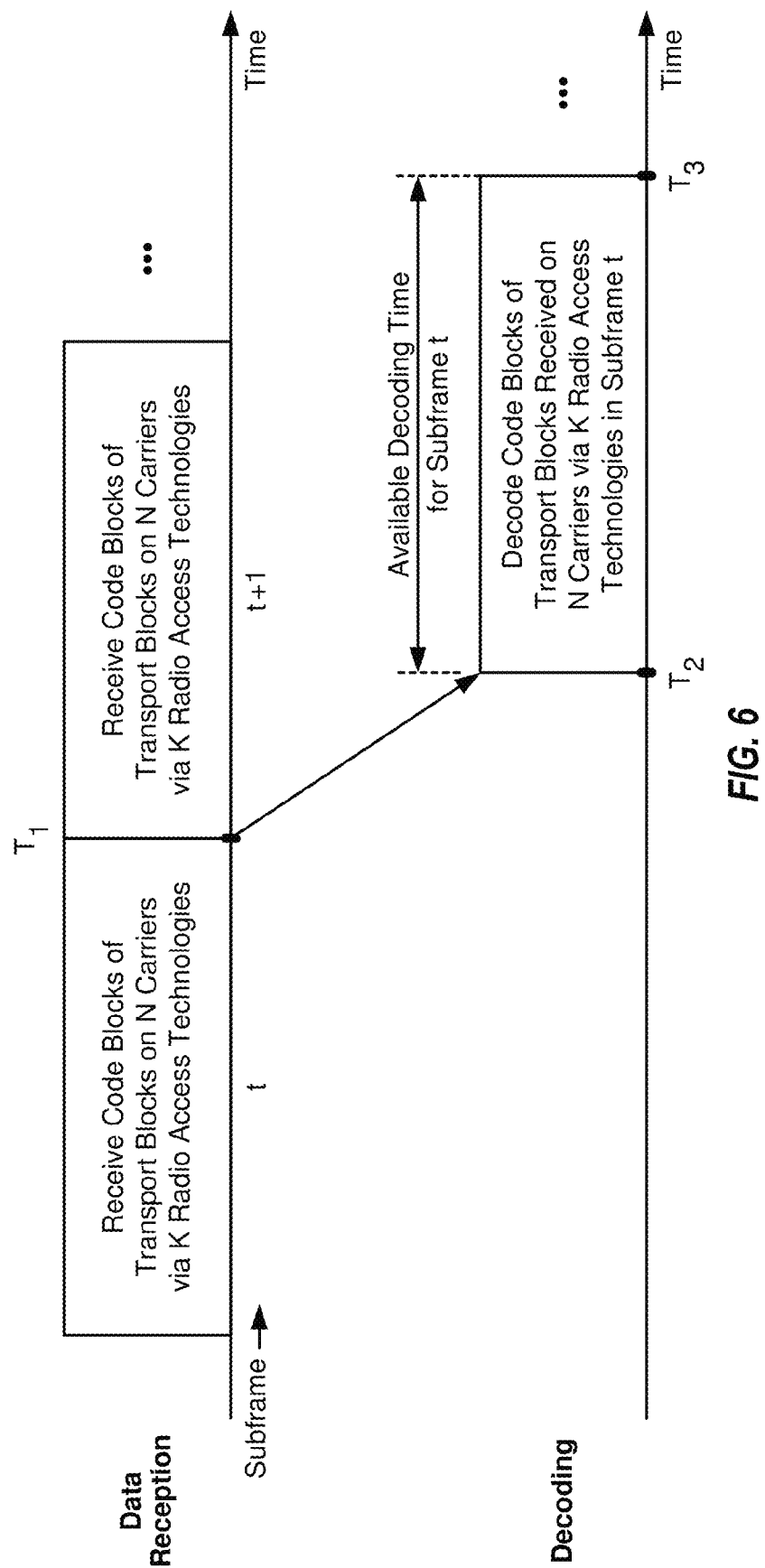
FIG. 6 shows an exemplary timeline for data reception and decoding at a receiver.

FIG. 6 shows an exemplary timeline for data reception and decoding at UE 110. A transmission timeline may be partitioned into units of subframes, with each subframe having a predetermined duration, e.g., 1 millisecond (ms). UE 110 may receive a number of code blocks in one or more transport blocks on N carriers via K radio access technologies in subframe t, where N and K may each be one or greater. UE 110 may finish reception of the code blocks in subframe t at time $T_1$ and may start decoding the received code blocks at time $T_2$. UE 110 may need to complete decoding all of the code blocks received in subframe t by time $T_3$. UE 110 may start decoding code blocks received in the next subframe t+1 at time $T_3$. The time duration from time $T_2$ to time $T_3$ may be referred to as an available decoding time of UE 110 for code blocks received in subframe t. The available decoding time for one subframe of code blocks may be equal to one subframe or shorter in order to allow UE 110 to receive data across subframes.

UE 110 may be designed with sufficient decoding capability for the worst-case operating conditions that might be encountered by UE 110. The worst-case operating conditions may correspond to the highest number of code blocks at the highest data rate for all carriers and all radio access technologies supported by UE 110. For example, UE 110 may be designed to receive up to P code blocks of the maximum size within a subframe and to perform Q decoding iterations for each code block, or a total of P*Q decoding iterations within the subframe. Designing UE 110 for the worst-case operating conditions may result in (i) much greater required decoding capability and much higher cost for UE 110 or (ii) fewer code blocks and a lower peak data rate being supported by UE 110 for a given decoding capability of the UE.

In an aspect of the present disclosure, the available decoding time of a receiver (e.g., UE 110) may be allocated to code blocks and shared across transport blocks, or carriers, or radio access technologies, or some other dimension, or a combination thereof. The sharing of available decoding time may improve decoding performance for a given decoding capability of the receiver. The sharing of available decoding time may allow the receiver to (i) support the worst-case operating conditions with less required decoding capability and (ii) provide better performance under other operating conditions.

The available decoding time of a receiver (e.g., UE 110) may be allocated and reallocated as follows:
  1. Initially allocate total available decoding time to code blocks of transport blocks,
  2. Decode one or more code blocks,
  3. Determine remaining available decoding time after decoding the code block(s), and
  4. Reallocate the remaining available decoding time to undecoded code blocks.

For step 1 above, code blocks may be initially allocated certain decoding times based on one or more factors, which may include one or more of the following:
  A. Number of code blocks to decode versus total available decoding time,
  B. Measured channel conditions versus expected channel conditions,
  C. Decoding performance of prior code blocks, and
  D. Other factors.

For factor A, an initial allocated decoding time for each code block may be dependent on the number of code blocks to decode and the total available decoding time of UE 110. Each code block may have a higher initial allocated decoding time if there are fewer code blocks to decode and/or if the total available decoding time is longer.

For factor B, the initial allocated decoding time for each code block may be dependent on measured and expected channel conditions for the code block. A code block may be encoded and modulated based on a particular MCS, which may be selected based on a received signal quality at UE 110. Signal quality may be quantified by a signal-to-noise ratio (SNR), a signal-to-noise-and-interference ratio (SINR), a carrier-to-noise-and-interference ratio (CINR), etc. For clarity, SINR is used for signal quality in much of the description herein. The selected MCS may be associated with a particular threshold SINR for reliable decoding of the code block. The actual channel conditions observed by a code block may be better or worse than the expected channel conditions associated with the selected MCS. Hence, the received SINR of the code block may be better or worse than the threshold SINR for the code block. The number of decoding iterations for the code block may be dependent on the difference between the received SINR and the threshold SINR. In particular, fewer decoding iterations (and hence a shorter decoding time) may be allocated to a code block when the received SINR is better than the threshold SINR, and vice versa.

For factor C, the number of decoding iterations performed for code blocks previously sent on the same resources (e.g., the same carrier, or the same spatial channel or antenna, or the same radio access technology) may be used to determine the number of decoding iterations for new code blocks received on the same resources. A wireless channel may be assumed to be static or slowly varying. It may then be assumed that a new code block can be correctly decoded in the same number of decoding iterations as a previously decoded code block. In one example the number of decoding iterations allocated to a code block of a transport block may be determined based on the actual number of decoding iterations performed for one or more previously decoded code blocks of the transport block. In another example the number of decoding iterations allocated to a code block of a transport block may be determined based on the actual number of decoding iterations performed for one or more code blocks of one or more other transport blocks already decoded.

For clarity, allocation of available decoding time to a plurality of code blocks of a plurality of transport blocks is described below for a specific example. In this example, UE 110 receives a plurality of code blocks on N carriers via one radio access technology in one subframe. The total number of data bits to be decoded in the subframe may be expressed as:

$$B_{total} = \sum_{n=1}^{N} \sum_{m=1}^{M_n} \sum_{l=1}^{L_{m,n}} B_{l,m,n}, \quad \text{Eq (1)}$$

where
 $M_n$ is the number transport blocks on the n-th carrier,
 $L_{m,n}$ is the number of code blocks of transport block (m,n), which is the m-th transport block on the n-th carrier,
 $B_{l,m,n}$ is the number of data bits in code block (l,m,n), which is the l-th code block of the m-th transport block on the n-th carrier, and
 $B_{total}$ is the total number of data bits for all code blocks sent on the N carriers.

An expected decoding time for a code block of B data bits may be expressed as:

$$T_{dec}(NUM_{dec}, B) = OH_{OT} + NUM_{dec} * \{OH_{dec} + T_{dec}(B),\} \quad \text{Eq (2)}$$

where
 $NUM_{dec}$ is the number of decoding iterations for the code block,
 $OH_{OT}$ is a one-time overhead time for decoding the code block,
 $OH_{dec}$ is an overhead time for each decoding iteration,
 $T_{dec}(B)$ is a decoding time for one decoding iteration of the code block, and
 $T_{dec}(NUM_{dec}, B)$ is a decoding time for the code block.

An expected decoding time for a transport block may be expressed as:

$$T_{m,n} = \sum_{l=1}^{L_{m,n}} T_{dec}(NUM_{l,m,n}, B_{l,m,n}), \quad \text{Eq (3)}$$

where $NUM_{l,m,n}$ is the number of decoding iterations for code block (l,m,n), and
 $T_{m,n}$ is an expected decoding time for transport block (m,n).

An initial number of decoding iterations may be allocated to each code block such that the total decoding time for all code blocks is less than the total available decoding time, as follows:

$$T_{init} = \sum_{n=1}^{N} \sum_{m=1}^{M_n} \sum_{l=1}^{L_{m,n}} T_{dec}(NUM_{init}, B_{l,m,n}) < T_{total}, \quad \text{Eq (4)}$$

where
 $NUM_{init}$ is the number of decoding iterations initially allocated to each code block,
 $T_{init}$ is a total decoding time initially allocated to all code blocks of all transport blocks, and
 $T_{total}$ is a total available decoding time of UE 110.

Equation (4) assumes that the total available decoding time of UE 110 is allocated to code blocks received via one radio access technology. $NUM_{init}$ may be the largest number of decoding iterations for each code block such that the total decoding time for all code blocks is less than the total available decoding time. Equation (4) assumes that the same initial number of decoding iterations of $NUM_{init}$ is allocated to all code blocks.

Different initial numbers of decoding iterations may also be allocated to different code blocks. In one example a smaller value of $NUM_{init}$ may be selected for a larger transport block or a larger code block, and vice versa. In another example a smaller value of $NUM_{init}$ may be selected for a code block observing better channel conditions (which may be measured or estimated) than expected channel conditions (which may be reflected in an MCS for the code block). In yet another example the total available decoding time may be allocated equally to all transport blocks on a carrier, and $NUM_{init}$ may be determined for each code block of each transport block based on the decoding time allocated to that transport block.

The total available decoding time of UE 110 may be dependent on the number of decoders available at UE 110. For example, UE 110 may have S decoders available for decoding code blocks, and the total available decoding time may be S ms in each 1 ms subframe, where S may be one or greater. The total available decoding time in a subframe may be equated to a total available number of decoding iterations, which may be allocated to code blocks received in the subframe. Each code block may be allocated a particular number of decoding iterations, e.g., based on transport block size, channel conditions observed by the code block, prior decoding performance, etc.

An initial allocated decoding time for each code block, each transport block, and each carrier may be expressed as:

$$T_{init,l,m,n} = T_{dec}(NUM_{init}, B_{l,m,n}) \quad \text{Eq (5)}$$
$$= OH_{OT} + NUM_{init} * \{OH_{dec} + T_{dec}(B_{l,m,n})\}$$

$$T_{init,m,n} = \sum_{l=1}^{L_{m,n}} T_{init,l,m,n}, \text{ and} \quad \text{Eq (6)}$$

$$T_{init,n} = \sum_{m=1}^{M_n} T_{init,m,n}, \quad \text{Eq (7)}$$

where $T_{init,l,m,n}$ is an initial allocated decoding time for code block (l,m,n)

$T_{init,m,n}$ is an initial allocated decoding time for transport block (m,n), and $T_{init,n}$ is an initial allocated decoding time for the n-th carrier.

UE 110 may decode one or more code blocks within the initial number of decoding iterations for each code block. UE 110 may successfully decode a given code block (l,m,n) in less than $NUM_{init}$ decoding iterations. UE 110 may have a left-over decoding time for code block (l,m,n), which may be the difference between the initial allocated decoding time and the actual decoding time for code block (l,m,n). The left-over decoding time for code block (l,m,n) may be reallocated to other code blocks to increase the number of decoding iterations for the other code blocks.

In a first scheme, decoding time may be reallocated across code blocks of the same transport block. In this scheme, left-over decoding times of one or more code blocks may be reallocated to remaining undecoded code blocks of the same transport block. A given transport block (m,n) may be initially allocated a particular decoding time as shown in equation (6). The actual decoding time for the first j code blocks of transport block (m,n) may be determined, where j may be any integer value of one or greater. In one example the actual decoding time may be directly measured and may include processing time for other hardware blocks such as an interleaver, a deinterleaver, etc. In another example the actual decoding time may be estimated based on the actual number of decoding iterations performed for each code block, as follows:

$$T_{actual,m,n}^j = \sum_{l=1}^{j} T_{dec}(NUM_{actual,l,m,n}, B_{l,m,n}), \quad \text{Eq (1)}$$

where $NUM_{actual,l,m,n}$ is an actual number of decoding iterations performed for code block (l,m,n), and $T_{actual,m,n}^j$ is an actual decoding time for the first j code blocks of transport block (m,n).

The remaining available decoding time for transport block (m,n) may be determined based on the initial allocated decoding time $T_{init,m,n}$ for transport block (m,n) and the actual decoding time for the first j code blocks of transport block (m,n). The remaining available decoding time for transport block (m,n) may be reallocated to the remaining code blocks of transport block (m,n). In one example an updated number of decoding iterations may be allocated to each remaining code block of transport block (m,n) as follows:

$$\sum_{l=j+1}^{L_{m,n}} T_{dec}(NUM_{updated}, B_{l,m,n}) < (T_{init,m,n} - T_{actual,m,n}^j), \quad \text{Eq (9)}$$

where $T_{init,m,n} - T_{actual,m,n}^j$ is the remaining available decoding time for transport block (m,n), and $NUM_{updated}$ is an updated number of decoding iterations for each remaining code block of transport block (m,n).

In equation (9), $NUM_{updated}$ may be the largest number of decoding iterations for each remaining code block of transport block (m,n) such that the total decoding time for all remaining code blocks of transport block (m,n) is less than the remaining available decoding time for transport block (m,n).

For the first scheme the remaining available decoding time for a transport block may be reallocated to remaining code blocks of the transport block. Reallocation may be performed after each code block is decoded, or after every two or three code blocks is decoded, or whenever the left-over decoding time exceeds a certain threshold, or based on other trigger conditions. Each code block that is decoded earlier than its allocated decoding time may result in some left-over decoding time (or some left-over decoding iterations) that may be reallocated and used for one or more remaining code blocks decoded later. The total decoding time for all code blocks of the transport block may be limited to the allocated decoding time for the transport block. Any left-over decoding time after all code blocks of the transport block have been decoded may be reallocated to other transport blocks, as described below.

In a second scheme decoding time may be reallocated across transport blocks on the same carrier. In this scheme left-over decoding times of a transport block may be reallocated to remaining transport blocks on the same carrier. Each carrier may be initially allocated a particular decoding time, e.g., as shown in equation (7). The actual decoding time for the first j transport blocks on the n-th carrier may be determined, where j may be any integer value of one or greater. In one example the actual decoding time may be directly measured. In another example the actual decoding time may be estimated based on the actual number of decoding iterations performed for each decoded code block.

The remaining available decoding time for the n-th carrier may be determined based on the initial allocated decoding time of $T_{init,n}$ for the n-th carrier and the actual decoding time of $T_{actual,n}^j$ for the first j transport blocks on the n-th carrier. The remaining available decoding time for the n-th carrier may be reallocated to the remaining code blocks on the n-th carrier. In one example an updated number of decoding iterations may be allocated to each remaining code block on the n-th carrier as follows:

$$\sum_{m=j+1}^{M_m} \sum_{l=1}^{L_{m,n}} T_{dec}(NUM_{updated}, B_{l,m,n}) < (T_{init,n} - T_{actual,n}^j), \quad \text{Eq (10)}$$

where $T_{init,n} - T_{actual,n}^j$ is the remaining available decoding time for the n-th carrier, and $NUM_{updated}$ is an updated number of decoding iterations for each remaining code block on the n-th carrier.

In equation (10), $NUM_{updated}$ may be the largest number of decoding iterations for each remaining code block on the n-th carrier such that the total decoding time for all remaining code blocks on the n-th carrier is less than the remaining available decoding time for the n-th carrier.

For the second scheme, the remaining available decoding time for a carrier may be reallocated to remaining code blocks on the carrier after each transport block is decoded, e.g., after the first transport block is decoded, then after the second transport block is decoded, etc. The reallocation may also be performed whenever the left-over decoding time exceeds a certain threshold or based on other trigger conditions. The total decoding time for all code blocks on the carrier may be limited to the allocated decoding time for the carrier. Any left-over decoding time after all code blocks on the carrier have been decoded may be reallocated to other carriers, as described below.

In a third scheme decoding time may be reallocated across carriers. In this scheme, left-over decoding times of a carrier may be reallocated to code blocks on remaining carriers. Each carrier may be initially allocated a particular decoding time, e.g., as shown in equation (7). The actual decoding time for the first j carriers may be determined, where j may be any integer value of one or greater.

The remaining available decoding time after j carriers have been decoded may be determined based on the total available decoding time $T_{total}$ and the actual decoding time of $T_{actual}^j$ for the first j carriers. The remaining available decoding time may be reallocated to code blocks on the remaining carriers. In one example an updated number of decoding iterations may be allocated to each code block on the remaining carriers as follows:

$$\sum_{n=j+1}^{N} \sum_{m=j+1}^{M_m} \sum_{l=1}^{L_{m,n}} T_{dec}(NUM_{updated}, B_{l,m,n}) < (T_{total} - T_{actual}^j), \quad \text{Eq (11)}$$

where $T_{total} - T_{actual}^j$ is the remaining available decoding time, and $NUM_{updated}$ is an updated number of decoding iterations for each code block on the remaining carriers.

In equation (11), $NUM_{updated}$ may be the largest number of decoding iterations for each code block on the remaining carriers such that the total decoding time for all code blocks on all remaining carriers is less than the remaining available decoding time after decoding the first j carriers.

For the third scheme the remaining available decoding time may be reallocated to remaining code blocks on remaining carriers after each carrier is decoded, e.g., after the first carrier is decoded, then after the second carrier is decoded, etc. The reallocation may also be performed whenever the left-over decoding time exceeds a certain threshold or based on other trigger conditions. The total decoding time for all code blocks on a carrier may be limited to the allocated decoding time for the carrier. Any left-over decoding time after all code blocks on the carrier have been decoded may be reallocated to other carriers, as described below.

Any one or any combination of the first, second and third schemes described above may be implemented. For example, the available decoding time may be reallocated across code blocks of a first transport block. Once all code blocks of the first transport block have been decoded, the remaining available decoding time may be determined and reallocated across remaining transport blocks of a first carrier. Once all transport blocks of the first carrier have been decoded, the remaining available decoding time may be determined and reallocated across remaining carriers. The available decoding time may also be reallocated in other manners.

The description above assumes that code blocks are received on N carriers via one radio access technology. In this case, the total available decoding time (or the available decoding resources) of UE 110 may be allocated to code blocks received via this radio access technology.

UE 110 may receive code blocks via multiple radio access technologies such as, e.g., LTE and HSPA, or LTE and IEEE 802.11, or some other combination of radio access technologies. In this case, the total available decoding time of UE 110 may be initially allocated to the multiple radio access technologies. The allocated decoding time for each radio access technology may be reallocated across code blocks of the same transport block, or across transport blocks of the same carrier, or across carriers, or a combination thereof, on that radio access technology, as described above. Any left-over decoding time for a given radio access technology may be reallocated to code blocks on another radio access technology.

In general, remaining available decoding time of UE 110 may be reallocated as follows:
Across code blocks of the same transport block,
Across transport blocks of the same carrier,
Across carriers of the same radio access technology, and/or
Across radio access technologies.

The total available decoding time of UE 110 may be initially allocated to all code blocks to be decoded in a given time interval. Reallocation may be performed at any point in time during the given time interval based on measurements or estimates of actual decoding times of all code blocks decoded prior to this point in time. Each code block may be allocated or reallocated a particular decoding time based on (i) the remaining available decoding time at the time of allocation or reallocation and (ii) other factors such as the number of code blocks to be decoded. Each code block may be allocated or reallocated at least a certain minimum decoding time or a certain minimum number of decoding iterations. The minimum decoding time or the minimum number of decoding iterations may be defined based on various constraints and/or decoding timeline considerations.

Figure 7:
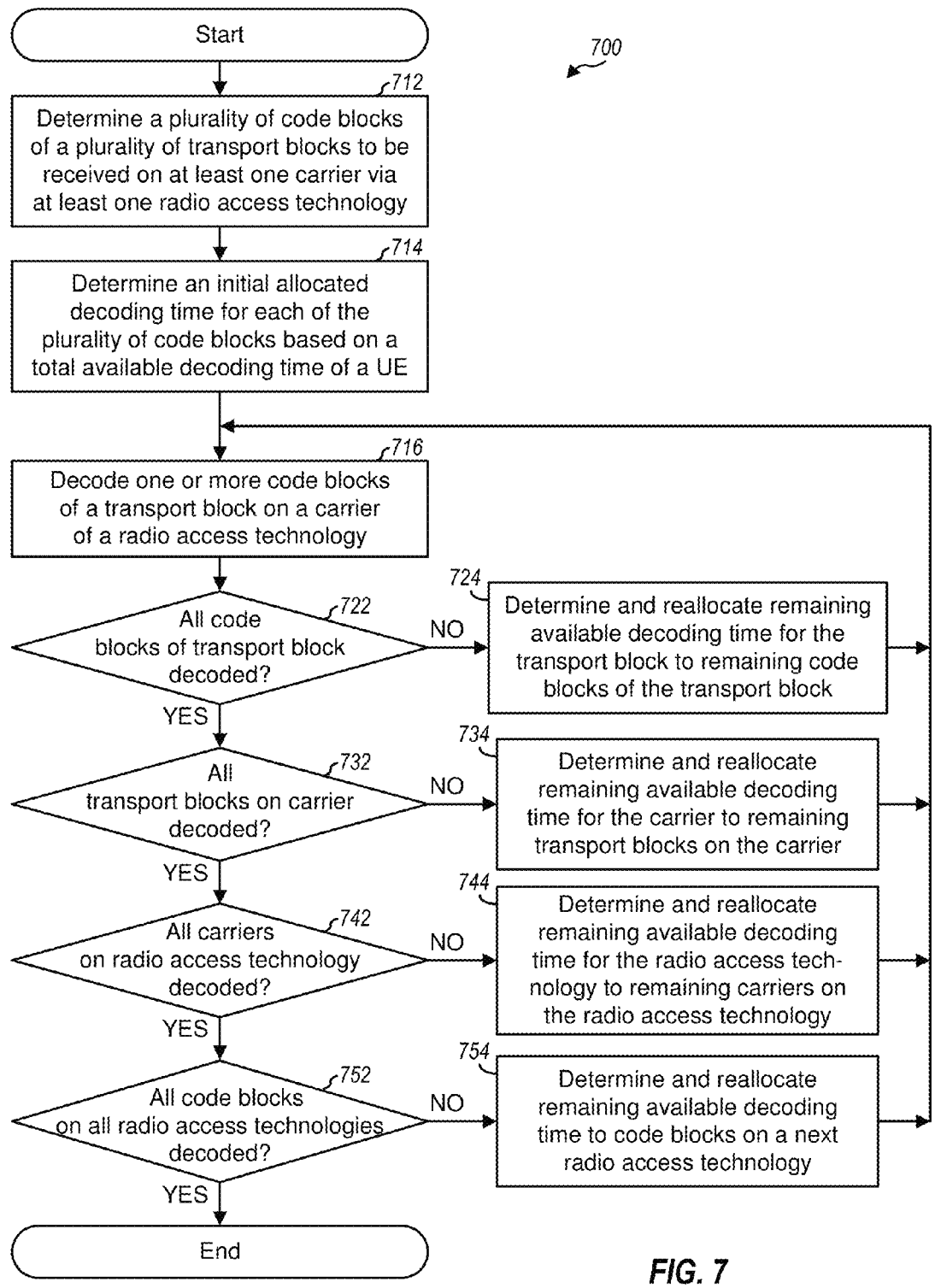
FIG. 7 shows a process for reallocating available decoding time.

FIG. 7 shows an exemplary process 700 for reallocating available decoding time. Process 700 may be performed by UE 110 or some other entity. Process 700 implements the first, second and third schemes described above and allocates the available decoding time across code blocks of the same transport block, across transport blocks of the same carrier, across carriers of the same radio access technology, and across radio access technologies.

A plurality of code blocks of a plurality of transport blocks to be received on at least one carrier via at least one radio access technology may be determined (block 712). An initial allocated decoding time for each of the plurality of code blocks may be determined based on a total available decoding time of UE 110, the number of code blocks to decode, and/or other factors (block 714).

One or more code blocks of a transport block on a carrier of a radio access technology may be decoded (block 716). Decoding of a code block may terminate early, when possible, in order to save decoding time and battery power. A number of decoding iterations may be allocated to a code block and may represent the maximum number of decoding iterations that can be performed for the code block. Decoding of the code block may terminate earlier than the maximum number of decoding iterations if one or more termination conditions are triggered. For example, decoding of the code block may terminate when its CRC passes, or when its LLR values are lower than a minimum LLR value, etc. The number of decoding iterations required to successfully decode the code block may be dependent on actual channel conditions (or received SINR) observed by the code block.

A determination may be made whether all code blocks of the transport block have been decoded (block 722). If the answer is "No", then remaining available decoding time for the transport block may be determined and reallocated to remaining code blocks of the transport block (block 724). The process may then return to block 716 to decode one or more remaining code blocks of the transport block.

If the answer is "Yes" for block 722 and all code blocks of the transport block have been decoded, then a determination may be made whether all transport blocks on the carrier have been decoded (block 732). If the answer is "No", then remaining available decoding time for the carrier may be determined and reallocated to remaining transport blocks on the carrier (block 734). The process may then return to block 716 to decode one or more code blocks of a next transport block.

If the answer is "Yes" for block 732 and all transport blocks of the carrier have been decoded, then a determination may be made whether all carriers on the radio access technology have been decoded (block 742). If the answer is "No", then remaining available decoding time for the radio access technology may be determined and reallocated to remaining carriers on the radio access technology (block 744). The process may then return to block 716 to decode one or more code blocks of a transport block on a next carrier.

If the answer is "Yes" for block 742 and all carriers of the radio access technology have been decoded, then a determination may be made whether all code blocks on all radio access technologies have been decoded (block 752). If the answer is "No", then remaining available decoding time may be determined and reallocated to code blocks on a next radio access technology (block 754). The process may then return to block 716 to decode one or more code blocks of a transport block on a carrier of the next radio access technology.

The exemplary process in FIG. 7 may enable a decoder to be shared by multiple radio access technologies. This may avoid having to dedicate at least one decoder to each radio access technology. For example, in a period of T μs, a decoder may process U code blocks of one radio access technology (e.g., LTE) and V code blocks of another radio access technology (e.g., UMTS). The number of decoding iterations for each code block may be determined based on available decoding time of the decoder.

In another aspect of the present disclosure, the number of decoding iterations to allocate to code blocks may be determined based on channel conditions. A code block may be encoded and modulated based on a particular MCS, which may be selected based on a spectral efficiency R of a wireless channel via which the code block is transmitted. The MCS may be associated with a particular code rate and a particular modulation scheme. The spectral efficiency may be dependent on an SINR observed by the code block. The number decoding iterations to allocate to the code block may be determined based on expected channel conditions (which may be reflected in the MCS) and actual channel conditions (which may be measured or estimated by a receiver).

A block error rate (BLER) of a code block may be dependent on various factors such an MCS selected for the code block, a received SINR of the code block, etc. The MCS may be associated with a particular threshold SINR in an additive Gaussian white noise (AWGN) channel for reliable decoding of the code block (e.g., with 1% BLER). The threshold SINR may also be referred to as a required SINR. The received SINR of the code block may be dependent on the actual channel conditions observed by the code block. The received SINR of the code block may be determined based on measured channel and interference conditions, which may be readily available at the receiver and used for various processing steps such as weighting of LLRs provided to a decoder.

For an AWGN channel and a code block of a sufficiently large size (e.g., a few thousands bits), BLER may follow a waterfall behavior near a threshold SINR value. In particular, BLER may be close to 100% for received SINR values below the threshold SINR value and may quickly transition to low levels (e.g., from 10% to 1%, then to 0.1%) as SINR crosses the threshold SINR value. The quick transition in BLER may occur within a small range of received SINR values, e.g., within a range of less then one decibel (dB). The number of decoding iterations to perform may be more critical in the waterfall region. For example, approximately 17 half decoding iterations may be required to obtain the most performance gain (e.g., to minimize BLER) near the threshold SINR value. The required number of half decoding iterations may drop quickly as received SINR increases. For example, three to five half decoding iterations may be sufficient when the received SINR is approximately 1 dB higher than the threshold SINR value. This observation may be exploited to improve performance.

In one example a look-up table may store a mapping of pairs of MCS and received SINR (or {MCS, SINR} pairs) to number of decoding iterations for reliable decoding of a code block. The look-up table may be a 2-dimensional (2D) table having (i) a first axis representing an MCS selected for a code block and (ii) a second axis representing received SINR of the code block. Each {MCS, SINR} location in the look-up table may store the number of decoding iterations for reliable decoding. The MCS and the received SINR of a code block may be determined and used to access the look-up table to obtain the number of decoding iterations to allocate to the code block.

In another example the number of decoding iterations to allocate to a code block may be determined based on a difference between a measured SINR and a threshold SINR, which may be referred to as an SINR difference. The threshold SINR may be determine based on MCS. A 1-dimensional (1D) table may store the number of decoding iterations for reliable decoding versus SINR difference. The difference between the received SINR and the threshold SINR of a code block may be determined and used to access the look-up table to obtain the number of decoding iterations to allocate to the code block.

In yet another example the available decoding time may be distributed across code blocks and/or transport blocks based on received SINRs and threshold SINRs for the code blocks and/or transport blocks. The available decoding time may also be distributed across code blocks and/or transport blocks in other manners.

In another aspect of the present disclosure channel state information (CSI) may be determined based on a target number of decoding iterations to allocate to code blocks. UE 110 may estimate the channel conditions based on a reference signal or a pilot from a base station and may determine CSI based on the estimated channel conditions. The CSI may include a channel quality indicator (CQI), a rank indicator (RI), a precoding matrix indicator (PMI), etc. CQI may be indicative of received SINR and may be mapped to an MCS. RI may be indicative of the number of layers or spatial channels to use for data transmission. PMI may be indicative of a precoding matrix or vector to use for spatial processing/precoding at a transmitter. A scheduler for a base station may schedule UE 110 for data transmission based on the CSI received from UE 110.

As noted above, a small SINR margin (e.g., on an order of approximately 1 dB) may substantially reduce the required number of decoding iterations. In one example the number of decoding iterations to allocate a code block may be reduced by introducing a negative bias in CQI reporting. For example, UE 110 may measure a received SINR of X dB but may determine an MCS based on a received SINR of X-ΔdB, where Δ denotes an amount of negative bias. A negative bias of approximately 1 dB may reduce the required number of decoding iterations to 3 to 5. The negative bias may result in a lower MCS being selected by UE 110 and sent as CSI feedback. The negative bias may result in a small loss of throughput in a high data rate (spectral efficiency) regime. The high data rate regime may support transmission of the largest number of code blocks and may have the highest decoding requirements. The high data rate regime may greatly benefit from the lower decoding requirements due to the negatively biased CQI reporting. The high data rate regime may also be able to tolerate a small loss of throughput due to the negatively biased CQI reporting.

The techniques disclosed herein may be used to support data transmission on the downlink, as described above. The techniques may also be used to support data transmission on the uplink.

The techniques disclosed herein exploit statistical averaging gain to improve decoding performance and obtain other benefits. Different code blocks may observe different channel conditions due to fading and/or interference variations and may be allocated different numbers of decoding iterations. The total number of decoding iterations required by all code blocks may be dependent on an average of the channel conditions observed by individual code blocks and may have less variations than the number of decoding iterations required by each code block. The statistical averaging gain may increase with the number of code blocks and/or the amount of resources (e.g., the number of spatial channels and/or the number of carriers) used for data transmission.

For example, a UE of Category 4 (Cat-4) in LTE may be required to support reception of two transport blocks of 75 kilobits (Kb) on a single 20 MHz carrier in one subframe for a peak data rate of 150 megabits/second (Mbps). The UE may have a total available decoding time of 1 ms, which may be allocated equally to the two transport blocks. Each transport block may then be allocated 500 μs of decoding time and may be transmitted based on an MCS selected to ensure that the transport block can be decoded within its 500 μs allocated decoding time. If all of the code blocks of the first transport block are decoded successfully earlier (e.g., in 400 μs) than the allocated decoding time, then the left-over decoding time of the first transport block may be reallocated to the second transport block. Each code block of the second transport block may then be allocated more decoding iterations due to the longer available decoding time (e.g., 600 μs) for the second transport block.

As another example, a UE in LTE Release 10 (Rel-10) may support data transmission with MIMO on two 20 MHz carriers at a peak data rate of 300 Mbps. The UE may receive up to four transport blocks, with each transport block including up to 13 code blocks at the peak data rate. Statistical averaging gain may be greater in this example. Interference variations across code blocks within each transport block may further increase the statistical averaging gain.

The techniques disclosed herein may support data reception via more dimensions, e.g., across spatial dimension with MIMO, across frequency dimension with carrier aggregation, and/or on multiple radio access technologies. MIMO and/or carrier aggregation may be used to increase data rate. However, MIMO and carrier aggregation may also create challenges in terms of complexity and power management with regard to decoding of code blocks. In particular, a plurality of code blocks may be sent simultaneously With MIMO and/or carrier aggregation and may experience different channel conditions in terms of fading and/or interference. Another source of channel variability across code blocks may be time and/or frequency selective fading and/or interference. For example, multiple code blocks may be mapped to time-frequency resources such that different code blocks occupy disjoint time intervals and hence may be exposed to different channel conditions due to temporal interference variations.

The techniques disclosed herein may enable a UE to be designed with decoding capability determined based on expected average channel conditions for all code blocks instead of worst-case channel conditions for each code block. The decoding capability of the UE may be determined based on a statistical distribution of total number of decoding iterations required for all code blocks across different possible channel conditions/realizations. The statistical distribution may be determined by computer simulation, empirical measurement, etc. The decoding capability required for the expected average channel conditions may be much less than the decoding capability required for the worst-case channel conditions for each code block. This may relax the decoding capability requirements of the UE for given data reception requirements (e.g., a given UE category) or allow the UE to support reception of more code blocks for a given decoding capability.

Figure 8:
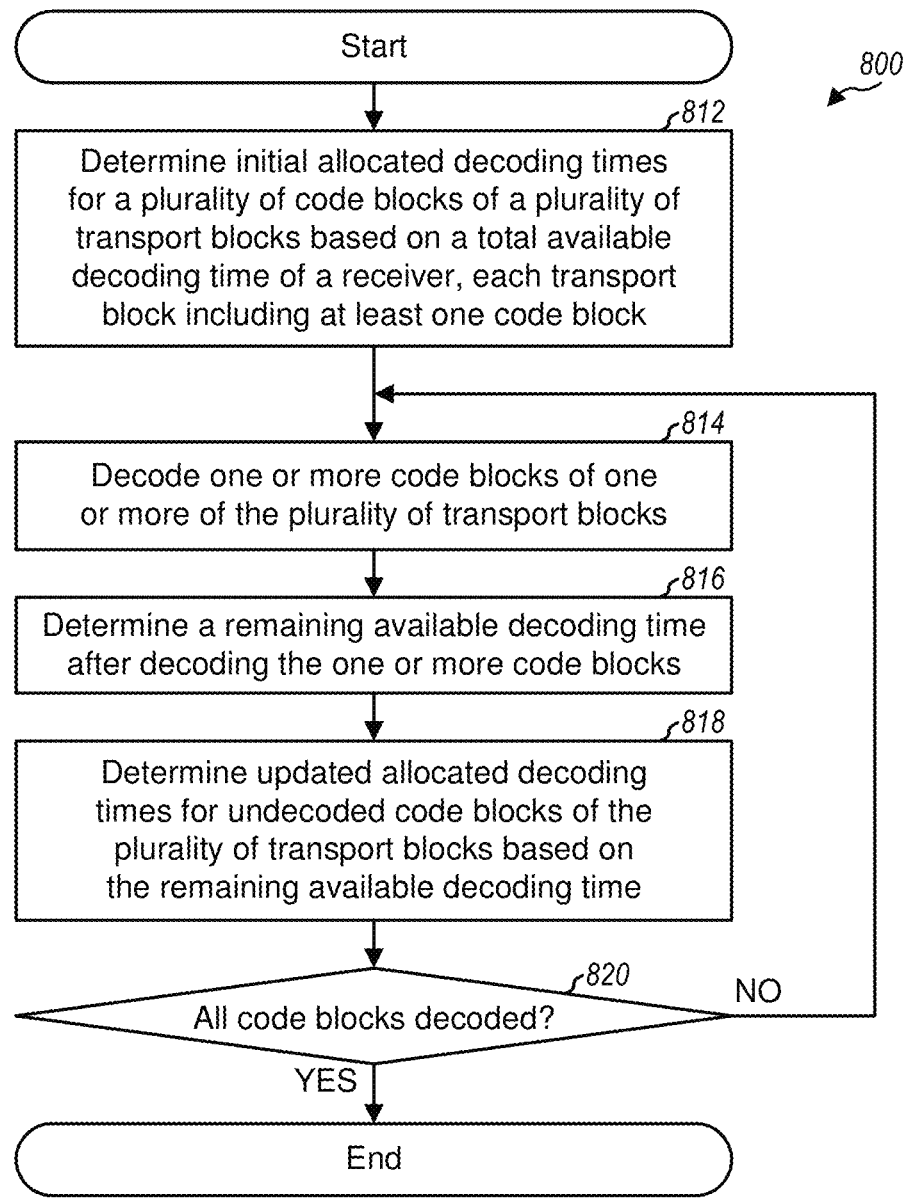
FIG. 8 shows a process for performing decoding by sharing available decoding time of a receiver.

FIG. 8 shows an exemplary process 800 for performing decoding by sharing available decoding time/budget of a receiver. Process 800 may be performed by UE 110 or some other entity.

Initial allocated decoding times for a plurality of code blocks of a plurality of transport blocks may be determined based on a total available decoding time of a receiver (block 812). Each transport block may include at least one code block, and each code block may have any size. The initial allocated decoding time for each code block may be given by a particular number of decoding iterations to perform for that code block.

One or more code blocks of one or more of the plurality of transport blocks may be decoded (block 814). Each code block may be decoded within the initial allocated decoding time for that code block. Each code block may be checked to determine whether it is decoded correctly or in error based on a CRC and/or LLRs of the code block. A given code block may be successfully decoded early, and decoding of the next code block may commence.

A remaining available decoding time after decoding the one or more code blocks of one or more of the plurality of transport blocks may be determined (block 816). The remaining available decoding time may be equal to the total available decoding time minus the actual decoding times of the one or more code blocks already decoded.

Updated allocated decoding times for undecoded code blocks of the plurality of transport blocks may be determined based on the remaining available decoding time (block 818). An undecoded code block is a code block not yet decoded. The one or more code blocks may be decoded earlier than their initial allocated decoding times. In this case, the remaining available decoding time may be longer than initially anticipated, and the updated allocated decoding time of an undecoded code block may be longer than the initial allocated decoding time of the undecoded code block.

A determination may then be made whether all code blocks of the plurality of transport blocks have been decoded (block 820). If the answer is "No", then the process may return to block 814 to decode one or more remaining code blocks.

Otherwise, if all code blocks have been decoded and the answer is "Yes" for block 820, then the process may terminate.

The plurality of transport blocks may be received via one or more spatial channels on one or more carriers via one or more radio access technologies. In one example the plurality of transport blocks may be received via a MIMO transmission from a plurality of transmit antennas to a plurality of receive antennas. In another example the plurality of transport blocks may be received on a plurality of carriers and may include at least one transport block on each of the plurality of carriers. In yet another example the plurality of transport blocks may be received via a plurality of radio access technologies and may include at least one transport block for each of the plurality of radio access technologies. The plurality of transport blocks may also be received via a combination of MIMO, carrier aggregation, and/or multiple radio access technologies.

The initial allocated decoding times for the plurality of code blocks may be determined in various manners. In one example the plurality of code blocks may be initially allocated equal decoding time or equal number of decoding iterations. In another example an initial allocated decoding time for a code block may be determined based on a received signal quality and/or an MCS for the code block. In yet another example an initial allocated decoding time for a code block may be determined based on a measured received signal quality and a threshold received signal quality for the code block. The threshold received signal quality may be determined by the MCS for the code block. In yet another example an initial allocated decoding time for a code block of a transport block may be determined based on an actual decoding time of a previously decoded code block of the transport block. In yet another example an initial allocated decoding time for a code block of a first transport block may be determined based on an actual decoding time of a previously decoded code block of a second transport block.

In one example the remaining available decoding time may be reallocated across code blocks of a transport block. The total available decoding time may be allocated to the plurality of transport blocks to obtain an allocated decoding time for each transport block, e.g., as shown in equation (6). The remaining available decoding time for a transport block may be determined, after decoding one or more code blocks of the transport block, based on the allocated decoding time for the transport block and actual decoding times of the one or more code blocks of the transport block. The remaining available decoding time for the transport block may be reallocated to undecoded code blocks of the transport block to obtain updated allocated decoding times for the undecoded code blocks.

In another example the remaining available decoding time may be reallocated across transport blocks, e.g., on the same carrier or the same radio access technology. The total available decoding time may be allocated to the plurality of transport blocks to obtain an allocated decoding time for each transport block. The remaining available decoding time of the receiver may be determined after decoding all code blocks of a transport block. Updated allocated decoding times for code blocks of at least one remaining transport block not yet decoded may be determined based on the remaining available decoding time of the receiver. For example, the remaining available decoding time of the receiver may be reallocated to the at least one remaining transport block. The reallocated decoding time for each remaining transport block may be reallocated to code blocks of that transport block.

In yet another example the remaining available decoding time may be reallocated across carriers, e.g., for the same radio access technology. The total available decoding time may be allocated to a plurality of carriers to obtain an allocated decoding time for each carrier. The remaining available decoding time of the receiver may be determined after decoding all code blocks of all transport blocks on a carrier. Updated allocated decoding times for code blocks of transport blocks for at least one remaining carrier not yet decoded may be determined based on the remaining available decoding time of the receiver. For example, the remaining available decoding time of the receiver may be reallocated to the at least one remaining carrier. The reallocated decoding time for each remaining carrier may be reallocated to code blocks on that carrier.

In yet another example the remaining available decoding time may be reallocated across radio access technologies. The total available decoding time may be allocated to a plurality of radio access technologies to obtain an allocated decoding time for each radio access technology. Remaining available decoding time of the receiver may be determined after decoding all code blocks of all transport blocks for a radio access technology. Updated allocated decoding times for code blocks of transport blocks for at least one remaining radio access technology not yet decoded may be determined based on the remaining available decoding time of the receiver. For example, the remaining available decoding time of the receiver may be reallocated to the at least one remaining radio access technology. The reallocated decoding time for each remaining radio access technology may be reallocated to code blocks on that radio access technology.

In general, the remaining available decoding time may be reallocated across any number of dimensions and any particular dimension. In one example the initial allocated decoding times for the plurality of code blocks of the plurality of transport blocks may be determined in each of a plurality of subframes. A subframe may be a unit of transmission time and may have a predetermined time duration.

In one example CQI may be generated based on desired/target allocation of available decoding time at the receiver. A received signal quality at the receiver may be estimated. A CQI may be determined based on the received signal quality and an offset. The offset may be selected to reduce a required number of decoding iterations for a code block sent based on the CQI. A larger offset may result in the code block being successfully decoded in fewer decoding iterations, assuming the actual received signal quality observed by the code block is similar to the estimated received signal quality. The CQI may be sent to a transmitter and may be used by the transmitter to encode and modulate the code block.

Figure 9:
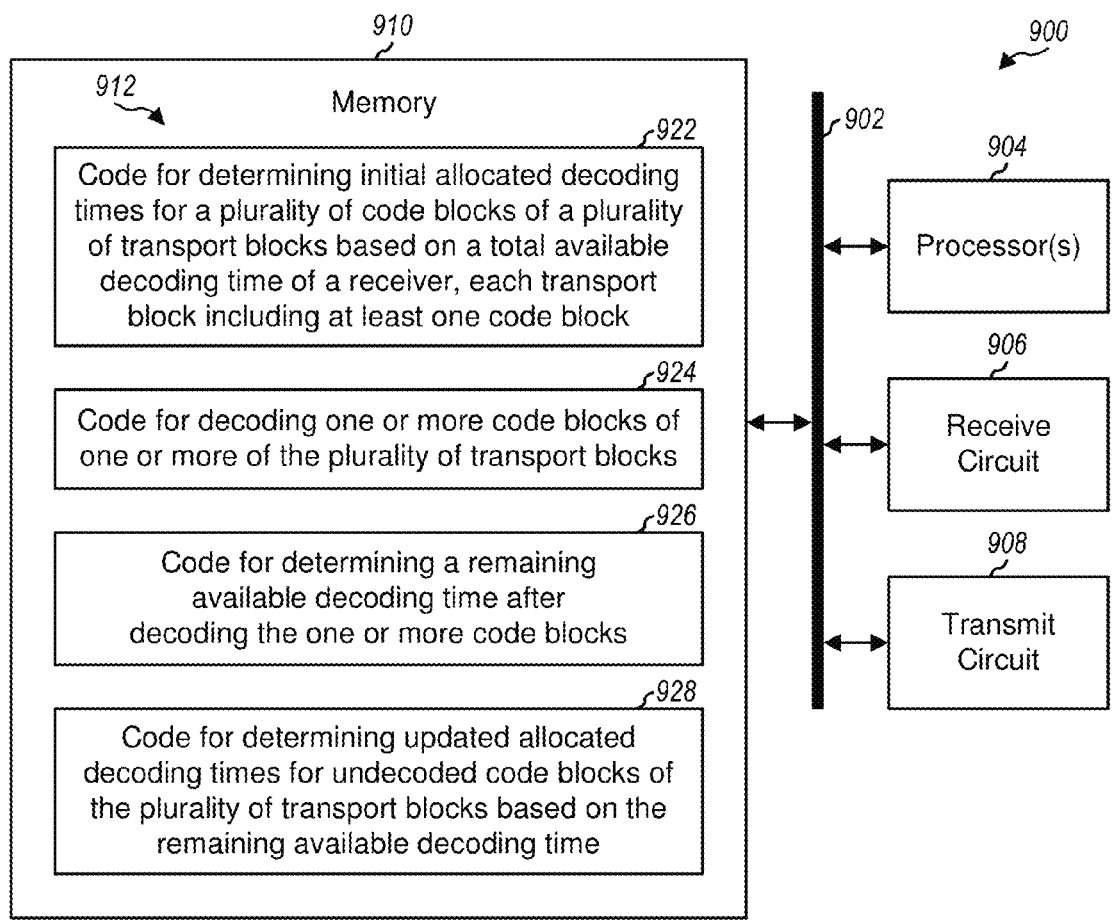
FIG. 9 shows an exemplary implementation of an apparatus.

FIG. 9 shows part of a hardware implementation of an apparatus 900, which may be able to perform process 700 in FIG. 7 and/or process 800 in FIG. 8. Apparatus 900 includes circuitry and may be one configuration of a UE (e.g., UE 110 in FIG. 1) or some other entity. In this specification and the appended claims, the term "circuitry" is construed as a structural term and not as a functional term. For example, circuitry may be an aggregate of circuit components, such as a multiplicity of integrated circuit components, in the form of processing and/or memory cells, units, blocks and the like, such as shown and described in FIG. 9.

Apparatus 900 comprises a central data bus 902 linking several circuits together. The circuits include at least one processor 904, a receive circuit 906, a transmit circuit 908, and a memory 910. Memory 910 is in electronic communication with processor(s) 904, so that processor(s) 904 may read information from and/or write information to memory 910. Processor(s) 904 may comprise a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. Processor(s) 904 may comprise a combination of processing devices, e.g., a combination of a DSP and a microprocessor, a plurality of microprocessors, one or more microprocessors in conjunction with a DSP core, or any other such configuration.

Receive circuit 906 and transmit circuit 908 may be connected to (or may include) an RF circuit (not shown in FIG. 9). Receive circuit 906 may process and buffer received signals before sending the signals out to data bus 902. Transmit circuit 908 may process and buffer data from data bus 902 before sending the data out of apparatus 900. Processor(s) 904 may perform the function of data management of data bus 902 and further the function of general data processing, including executing the instructional contents of memory 910. Transmit circuit 908 and receive circuit 906 may be external to processor(s) 904 (as shown to FIG. 9) or may be part of processor(s) 904.

Memory 910 stores a set of instructions 912 executable by processor(s) 904 to implement the methods described herein. To implement process 800 in FIG. 8, instructions 912 may include code 922 for determining initial allocated decoding times for a plurality of code blocks of a plurality of transport blocks based on a total available decoding time of a receiver or apparatus 900, each transport block including at least one code block, code 924 for decoding one or more code blocks of one or more of the plurality of transport blocks, code 926 for determining a remaining available decoding time after decoding the one or more code blocks, and code 928 for determining updated allocated decoding times for undecoded code blocks of the plurality of transport blocks based on the remaining available decoding time. Instructions 912 may include other codes for other functions, e.g., codes to implement process 700 in FIG. 7. Memory 910 may store one or more look-up tables, which may store the number of decoding iterations to allocate to a code block versus {MCS, SINR} pairs or versus SINR difference (difference between measured SINR and threshold SINR).

Instructions 912 shown in memory 910 may comprise any type of computer-readable statement(s). For example, instructions 912 in memory 910 may refer to one or more programs, routines, sub-routines, modules, functions, procedures, data sets, etc. Instructions 912 may comprise a single computer-readable statement or many computer-readable statements.

Memory 910 may be a RAM (Random Access Memory) circuit. Memory 910 may be tied to another memory circuit (not shown), which may either be of a volatile or a nonvolatile type. As an alternative, memory 910 may be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. Memory 910 may be considered to be an example of a computer-program product that comprises a computer-readable medium with instructions 912 stored therein.

Apparatus 900 may implement transmitter 210 and/or receiver 250 in FIG. 2. To implement transmitter 210 in apparatus 900, processor(s) 904 may implement encoder 220, modulator 230, and controller/processor 240, memory 912 may implement data source 212 and memory 242, and transmit circuit 908 may implement TX unit 232. The functions of encoder 220 and modulator 230 may be implemented in hardware, software, and/or firmware. The software and/or firmware (if any) for encoder 220 and modulator 230 may be stored in memory 912 and executed by processor(s) 904. The hardware (if any) for encoder 220 and modulator 230 may be part of processor(s) 904. To implement receiver 250 in apparatus 900, processor(s) 904 may implement demodulator 260, decoder 270, and controller/processor 280, memory 912 may implement data sink 272 and memory 282, and receive circuit 906 may implement RX unit 252. The functions of demodulator 260 and decoder 270 may be implemented in hardware, software, and/or firmware. The software and/or firmware (if any) for demodulator 260 and decoder 270 may be stored in memory 912 and executed by processor(s) 904. The hardware (if any) for demodulator 260 and decoder 270 may be part or processor(s) 904.

FIG. 9 shows an exemplary block diagram of an apparatus for a wireless device/UE. The processor(s), memory, and circuits in FIG. 9 may be implemented in various manners. For instance in one example, a wireless device may include an ASIC, one or more memories coupled to the ASIC, and one or more RFICs coupled to the ASIC. Processor 904 may be implemented within the ASIC. Memory 910 may be implemented with one or more memories external to the ASIC and/or one or more memories internal to the ASIC. Receive circuit 906 and transmit circuit 908 may be implemented on the RFIC(s). A wireless device may also include different and/or other processors, memories, and circuits not shown in FIG. 9. The processors, memories, and circuits of a wireless device may also be implemented in other manners different from the examples described above.

The previous description of the disclosure is presented to enable any person skilled in the art to make and use the disclosure. Details are set forth in the previous description for purpose of explanation. It should be appreciated that one of ordinary skill in the art would realize that the disclosure may be practiced without the use of these specific details. In other instances, well-known structures and processes are not elaborated in order not to obscure the description of the disclosure with unnecessary details. Thus, the present invention is not intended to be limited by the examples and designs described herein, but is to be accorded with the widest scope consistent with the principles and features disclosed herein.

The functions described herein may be implemented in hardware, software, firmware, or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), Poppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber-optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the networks, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   receiving, by a receiver, a plurality of code blocks of a plurality of transport blocks on a plurality of carriers, the plurality of transport blocks including at least one transport block on each of the plurality of carriers;
   determining initial allocated decoding times for the plurality of code blocks of the plurality of transport blocks based on a total available decoding time of the receiver, each transport block including at least one code block;
   determining a remaining available decoding time after decoding one or more code blocks of one or more of the plurality of transport blocks; and
   determining updated allocated decoding times for undecoded code blocks of the plurality of transport blocks based on the remaining available decoding time, wherein determining the updated allocated decoding times comprises reallocating a remaining available decoding time for a carrier to at least one code block on at least one different carrier.

2. The method of claim 1, further comprising:
   receiving the plurality of transport blocks via a multiple-input multiple-output (MIMO) transmission from a plurality of transmit antennas to a plurality of receive antennas.

3. The method of claim 1, wherein the receiving further comprises receiving the plurality of transport blocks via a plurality of radio access technologies, the plurality of transport blocks including at least one transport block for each of the plurality of radio access technologies, wherein determining the updated allocated decoding times comprises reallocating a remaining available decoding time for a radio access technology to at least one code block on a different radio access technology.

4. The method of claim 3, further comprising:
   determining an allocated decoding time for each of the plurality of radio technologies,
   wherein the determining a remaining available decoding time comprises determining remaining available decoding time of the receiver after decoding all code blocks of all transport blocks for a radio access technology among the plurality of radio access technologies, and
   wherein the determining updated allocated decoding times comprises determining updated allocated decoding times for code blocks of transport blocks for at least one remaining radio access technology not yet decoded based on the remaining available decoding time of the receiver.

5. The method of claim 1, wherein the plurality of code blocks are allocated equal initial allocated decoding times or equal number of decoding iterations.

6. The method of claim 1, wherein the determining initial allocated decoding times comprises determining an initial allocated decoding time for a code block based on a received signal quality for the code block, or a modulation and coding scheme (MCS) for the code block, or both.

7. The method of claim 1, wherein the determining initial allocated decoding times comprises determining an initial allocated decoding time for a code block based on a measured received signal quality and a threshold received signal quality for the code block.

8. The method of claim 1, wherein the determining initial allocated decoding times comprises determining an initial allocated decoding time for a code block of a transport block based on an actual decoding time of a decoded code block of the transport block.

9. The method of claim 1, wherein the determining initial allocated decoding times comprises determining an initial allocated decoding time for a code block of a transport block based on an actual decoding time of a decoded code block of another transport block.

10. The method of claim 1, further comprising:
    determining an allocated decoding time for each of the plurality of transport blocks,
    wherein the determining a remaining available decoding time comprises determining a remaining available decoding time for a transport block among the plurality of transport blocks, after decoding one or more code blocks of the transport block, based on the allocated decoding time for the transport block and actual decoding times of the one or more code blocks of the transport block, and
    wherein the determining updated allocated decoding times comprises determining updated allocated decoding times for undecoded code blocks of the transport block based on the remaining available decoding time for the transport block.

11. The method of claim 10, wherein the determining an allocated decoding time for each of the plurality of transport blocks comprises determining the allocated decoding time for each transport block based on initial allocated decoding times for all code blocks of said each transport block.

12. The method of claim 1, further comprising:
    determining an allocated decoding time for each of the plurality of transport blocks,
    wherein the determining a remaining available decoding time comprises determining remaining available decoding time of the receiver after decoding all code blocks of a transport block among the plurality of transport blocks, and
    wherein the determining updated allocated decoding times comprises
       determining an updated allocated decoding time for each remaining transport block not yet decoded based on the remaining available decoding time of the receiver, and
       determining an updated allocated decoding time for each code block of each remaining transport block not yet decoded based on the updated allocated decoding time for said each remaining transport block.

13. The method of claim 1, further comprising:
    determining an allocated decoding time for each of the plurality of carriers,
    wherein the determining a remaining available decoding time comprises determining remaining available decoding time of the receiver after decoding all code blocks of all transport blocks on a carrier among the plurality of carriers, and wherein the determining updated allocated decoding times comprises determining updated allocated decoding times for code blocks of transport blocks for at least one remaining carrier not yet decoded based on the remaining available decoding time of the receiver.

14. The method of claim 1, wherein determining the initial allocated decoding times comprises determining the initial allocated decoding times for the plurality of code blocks of the plurality of transport blocks in each of a plurality of subframes, each subframe having a predetermined time duration.

15. An apparatus for wireless communication, comprising:
means for receiving, by a receiver, a plurality of code blocks of a plurality of transport blocks on a plurality of carriers, the plurality of transport blocks including at least one transport block on each of the plurality of carriers;
means for determining initial allocated decoding times for the plurality of code blocks of the plurality of transport blocks based on a total available decoding time of the receiver, each transport block including at least one code block;
means for determining a remaining available decoding time after decoding one or more code blocks of one or more of the plurality of transport blocks; and
means for determining updated allocated decoding times for undecoded code blocks of the plurality of transport blocks based on the remaining available decoding time, wherein the means for determining the updated allocated decoding times comprises means for reallocating a remaining available decoding time for a carrier to at least one code block on at least one different carrier.

16. The apparatus of claim 15, wherein the means for determining initial allocated decoding times comprises means for determining an initial allocated decoding time for a code block based on a received signal quality for the code block, or a modulation and coding scheme (MCS) for the code block, or both.

17. The apparatus of claim 15, wherein the means for determining initial allocated decoding times comprises means for determining an initial allocated decoding time for a code block based on a measured received signal quality and a threshold received signal quality for the code block.

18. The apparatus of claim 15, further comprising:
means for determining an allocated decoding time for each of the plurality of transport blocks,
wherein the means for determining a remaining available decoding time comprises means for determining a remaining available decoding time for a transport block among the plurality of transport blocks, after decoding one or more code blocks of the transport block, based on the allocated decoding time for the transport block and actual decoding times of the one or more code blocks of the transport block, and
wherein the means for determining updated allocated decoding times comprises means for determining updated allocated decoding times for undecoded code blocks of the transport block based on the remaining available decoding time for the transport block.

19. The apparatus of claim 15, further comprising:
means for determining an allocated decoding time for each of the plurality of transport blocks,
wherein the means for determining a remaining available decoding time comprises means for determining remaining available decoding time of the receiver after decoding all code blocks of a transport block among the plurality of transport blocks, and wherein the means for determining updated allocated decoding times comprises
means for determining an updated allocated decoding time for each remaining transport block not yet decoded based on the remaining available decoding time of the receiver, and
means for determining an updated allocated decoding time for each code block of each remaining transport block not yet decoded based on the updated allocated decoding time for said each remaining transport block.

20. The apparatus of claim 15, further comprising:
means for determining an allocated decoding time for each of the plurality of carriers,
wherein the means for determining a remaining available decoding time comprises means for determining remaining available decoding time of the receiver after decoding all code blocks of all transport blocks on a carrier among a plurality of carriers, and
wherein the means for determining updated allocated decoding times comprises means for determining updated allocated decoding times for code blocks of transport blocks for at least one remaining carrier not yet decoded based on the remaining available decoding time of the receiver.

21. The apparatus of claim 15, further comprising:
means for determining an allocated decoding time for each of the plurality of radio technologies,
wherein the means for determining a remaining available decoding time comprises means for determining remaining available decoding time of the receiver after decoding all code blocks of all transport blocks for a radio access technology among a plurality of radio access technologies, and
wherein the means for determining updated allocated decoding times comprises means for determining updated allocated decoding times for code blocks of transport blocks for at least one remaining radio access technology not yet decoded based on the remaining available decoding time of the receiver.

22. An apparatus for wireless communication, comprising:
a processor;
memory in electronic communication with the processor;
instructions stored in the memory, the instructions being executable by the processor to:
receive a plurality of code blocks of a plurality of transport blocks on a plurality of carriers, the plurality of transport blocks including at least one transport block on each of the plurality of carriers;
determine initial allocated decoding times for the plurality of code blocks of the plurality of transport blocks based on a total available decoding time of the receiver, each transport block including at least one code block;
determine a remaining available decoding time after decoding one or more code blocks of one or more of the plurality of transport blocks; and
determine updated allocated decoding times for undecoded code blocks of the plurality of transport blocks based on the remaining available decoding time, wherein determining the updated allocated decoding times comprises reallocating a remaining available decoding time for a carrier to at least one code block on at least one different carrier.

23. The apparatus of claim 22, wherein the instructions are also executable by the processor to determine an initial allocated decoding time for a code block based on a received signal quality for the code block, or a modulation and coding scheme (MCS) for the code block, or both.

24. The apparatus of claim 22, wherein the instructions are also executable by the processor to determine an initial allocated decoding time for a code block based on a measured received signal quality and a threshold received signal quality for the code block.

25. The apparatus of claim 22, wherein the instructions are also executable by the processor to:
- determine an allocated decoding time for each of the plurality of transport blocks;
- determine a remaining available decoding time for a transport block among the plurality of transport blocks, after decoding one or more code blocks of the transport block, based on the allocated decoding time for the transport block and actual decoding times of the one or more code blocks of the transport block; and
- determine updated allocated decoding times for undecoded code blocks of the transport block based on the remaining available decoding time for the transport block.

26. The apparatus of claim 22, wherein the instructions are also executable by the processor to:
- determine an allocated decoding time for each of the plurality of transport blocks;
- determine remaining available decoding time of the receiver after decoding all code blocks of a transport block among the plurality of transport blocks;
- determine an updated allocated decoding time for each remaining transport block not yet decoded based on the remaining available decoding time of the receiver; and
- determine an updated allocated decoding time for each code block of each remaining transport block not yet decoded based on the updated allocated decoding time for said each remaining transport block.

27. The apparatus of claim 22, wherein the instructions are also executable by the processor to:
- determine an allocated decoding time for each of the plurality of carriers;
- determine remaining available decoding time of the receiver after decoding all code blocks of all transport blocks on a carrier among a plurality of carriers; and
- determine updated allocated decoding times for code blocks of transport blocks for at least one remaining carrier not yet decoded based on the remaining available decoding time of the receiver.

28. The apparatus of claim 22, wherein the instructions are also executable by the processor to:
- determine an allocated decoding time for each of a plurality of radio technologies;
- determine remaining available decoding time of the receiver after decoding all code blocks of all transport blocks for a radio access technology among a plurality of radio access technologies; and
- determine updated allocated decoding times for code blocks of transport blocks for at least one remaining radio access technology not yet decoded based on the remaining available decoding time of the receiver.

29. A non-transitory computer-readable medium comprising:
- code for causing at least one computer to receive a plurality of code blocks of a plurality of transport blocks on a plurality of carriers, the plurality of transport blocks including at least one transport block on each of the plurality of carriers;
- code for causing the at least one computer to determine initial allocated decoding times for the plurality of code blocks of the plurality of transport blocks based on a total available decoding time of the receiver, each transport block including at least one code block;
- code for causing the at least one computer to determine a remaining available decoding time after decoding one or more code blocks of one or more of the plurality of transport blocks; and
- code for causing the at least one computer to determine updated allocated decoding times for undecoded code blocks of the plurality of transport blocks based on the remaining available decoding time, wherein the code for causing the at least one computer to determine the updated allocated decoding times comprises code for causing the at least one computer to reallocate a remaining available decoding time for a carrier to at least one code block on at least one different carrier.

* * * * *